No. 836,117. PATENTED NOV. 20, 1906.
D. A. KENNEDY.
BAND SAW MACHINE.
APPLICATION FILED APR. 10, 1905.
6 SHEETS—SHEET 1.
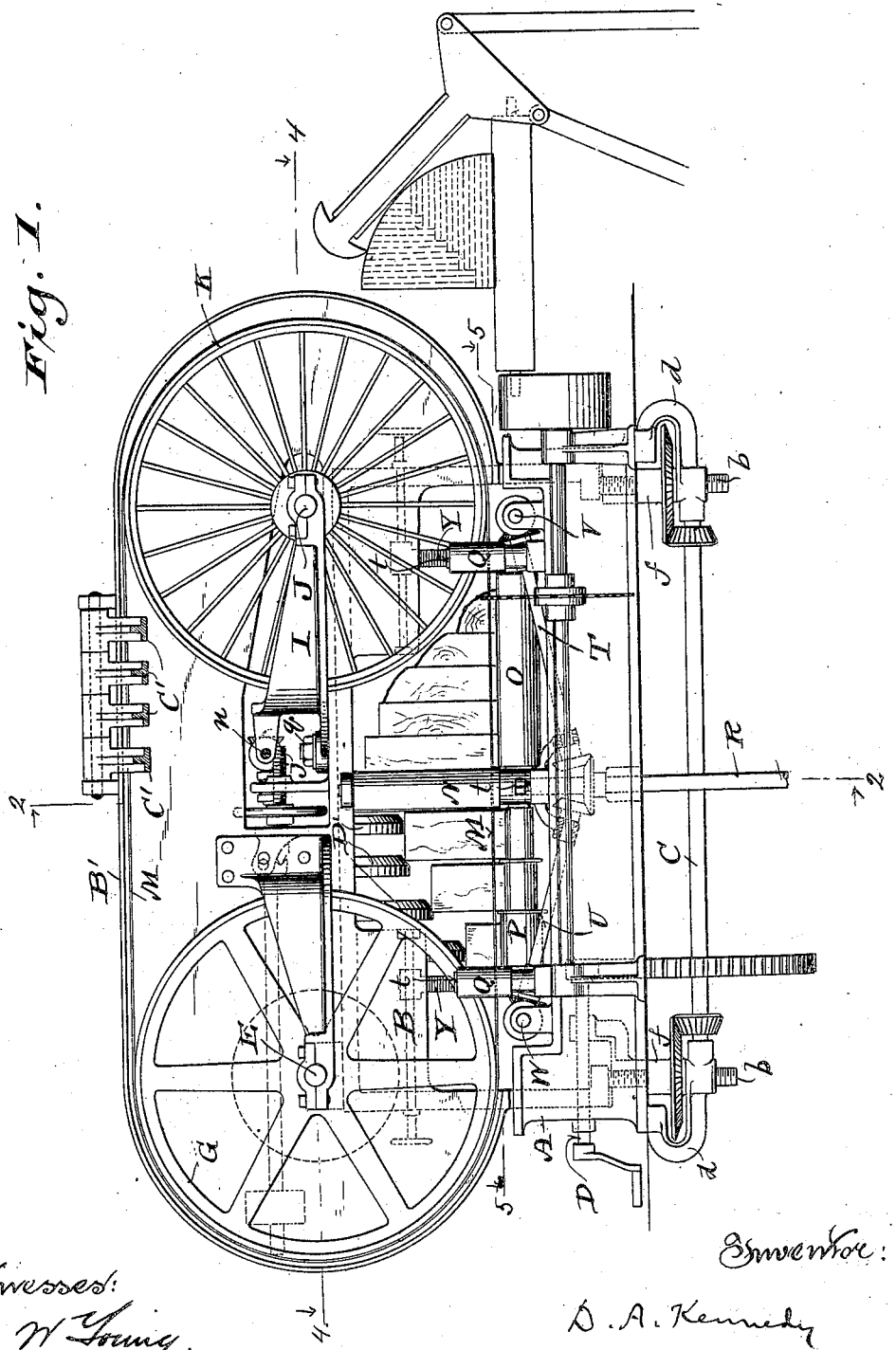

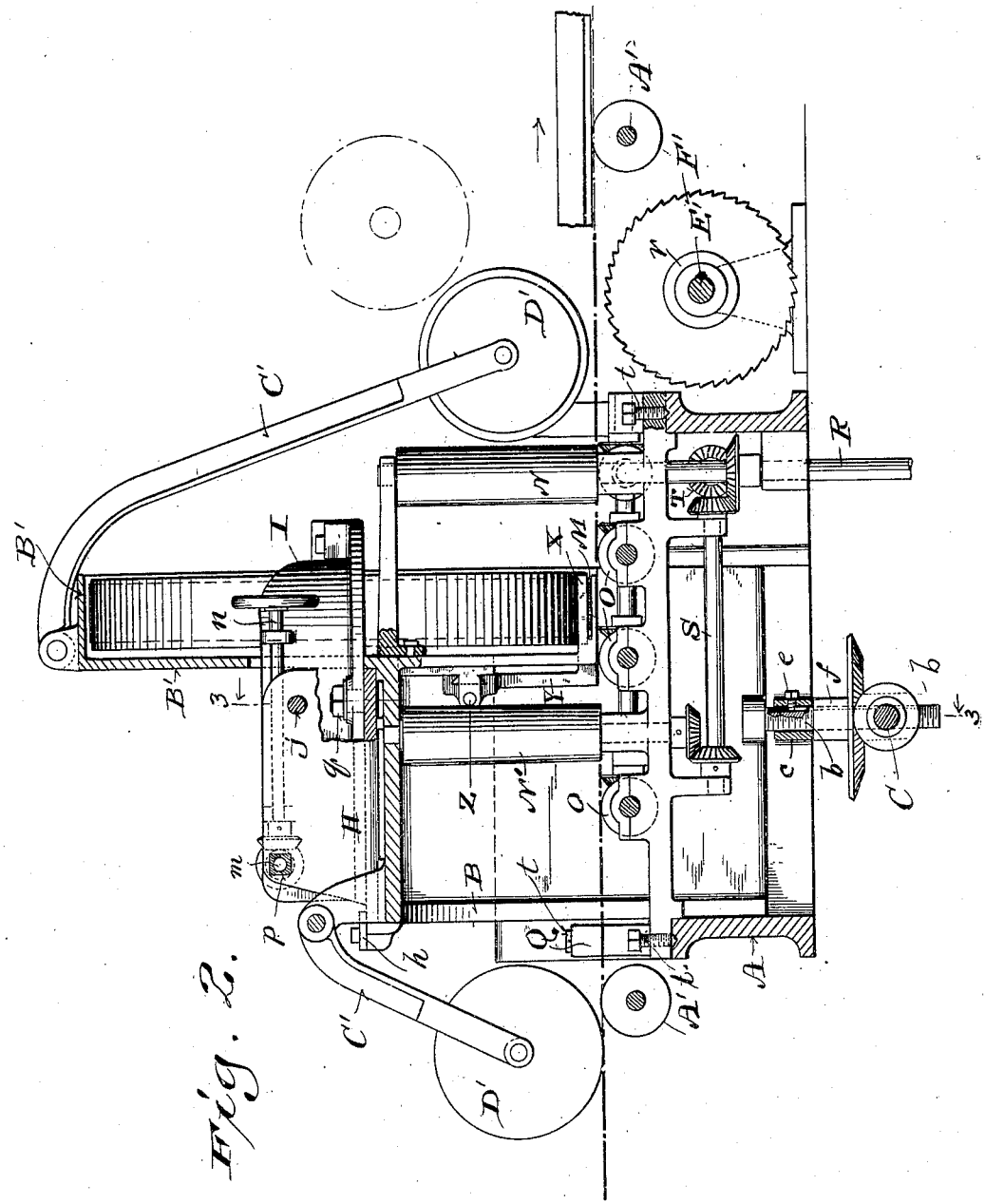

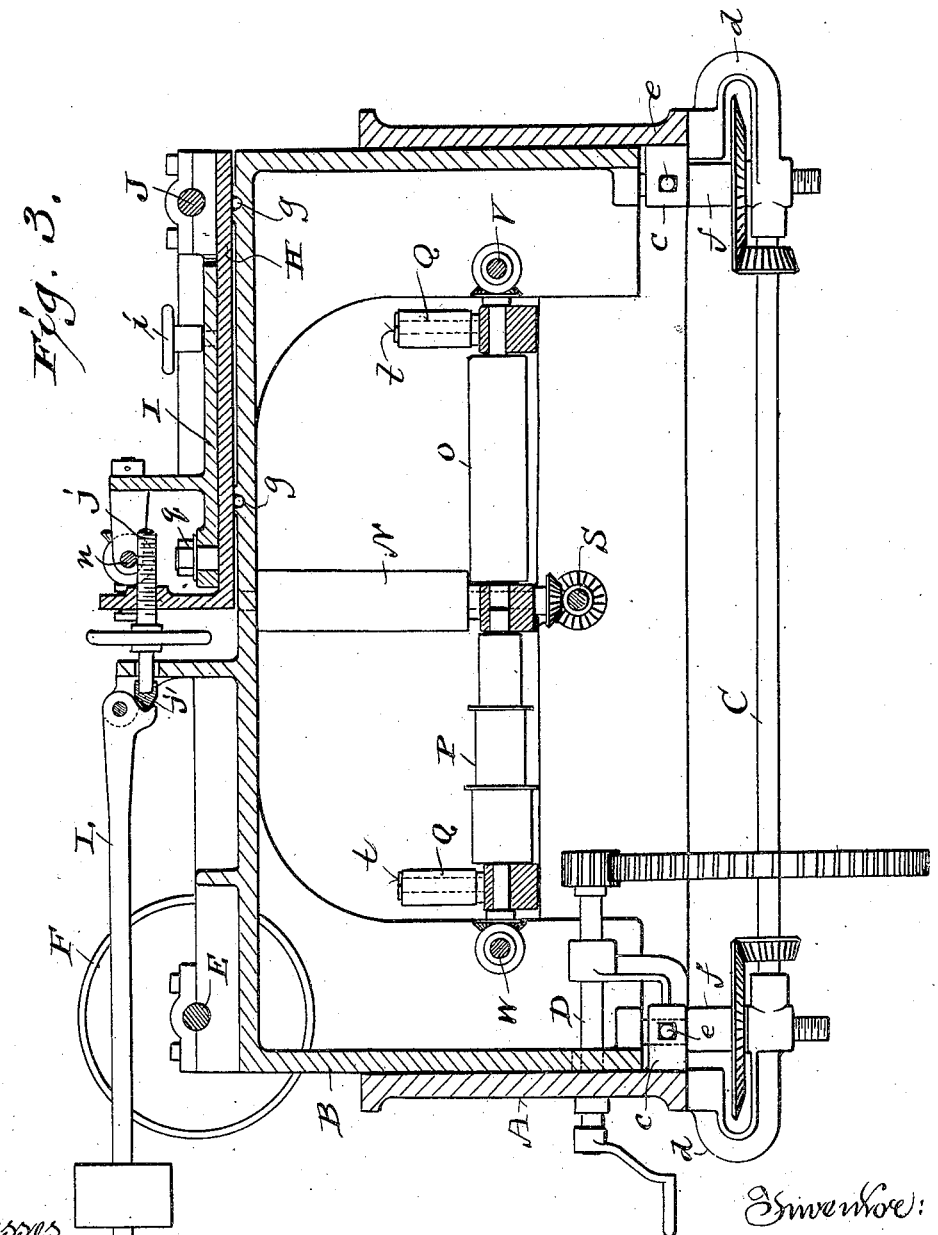

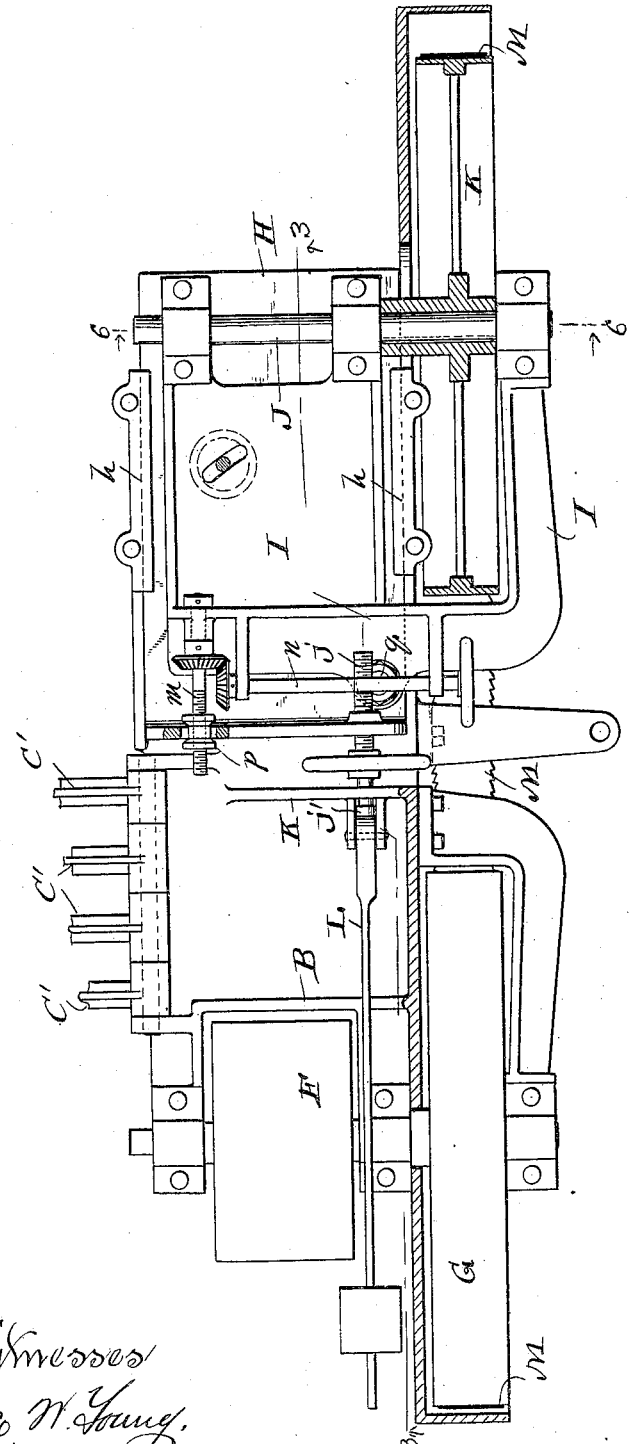

No. 836,117. PATENTED NOV. 20, 1906.
D. A. KENNEDY.
BAND SAW MACHINE.
APPLICATION FILED APR. 10, 1905.
6 SHEETS—SHEET 5.
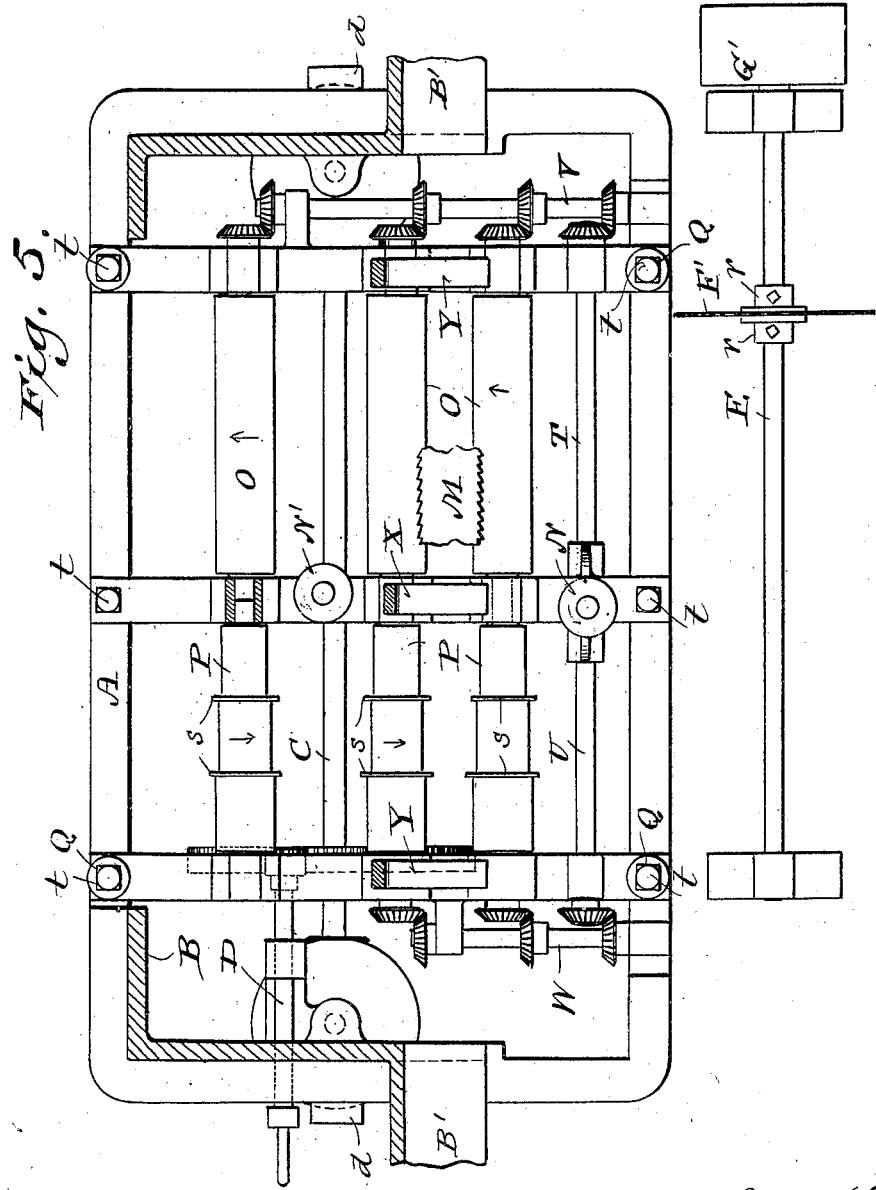

No. 836,117. PATENTED NOV. 20, 1906.
D. A. KENNEDY.
BAND SAW MACHINE.
APPLICATION FILED APR. 10, 1905.
6 SHEETS—SHEET 6.
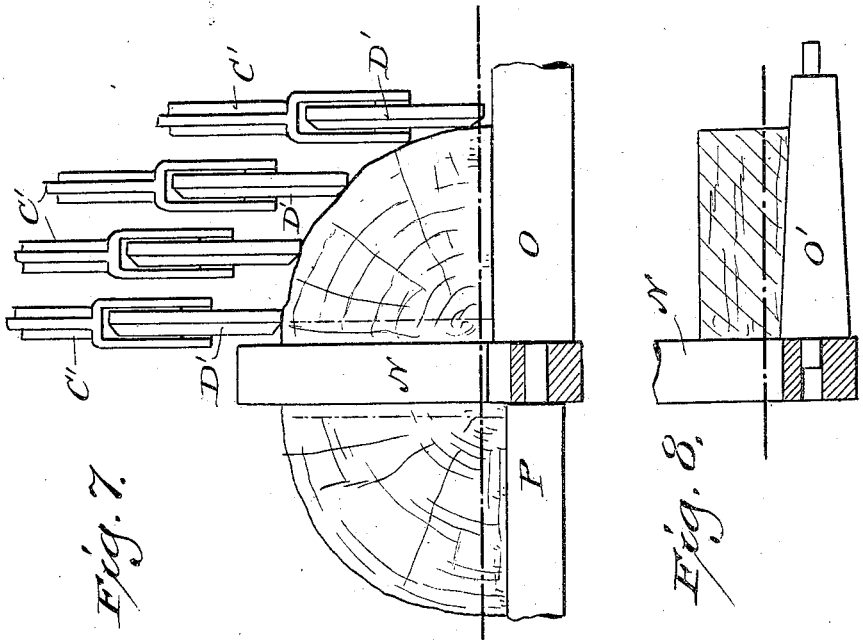
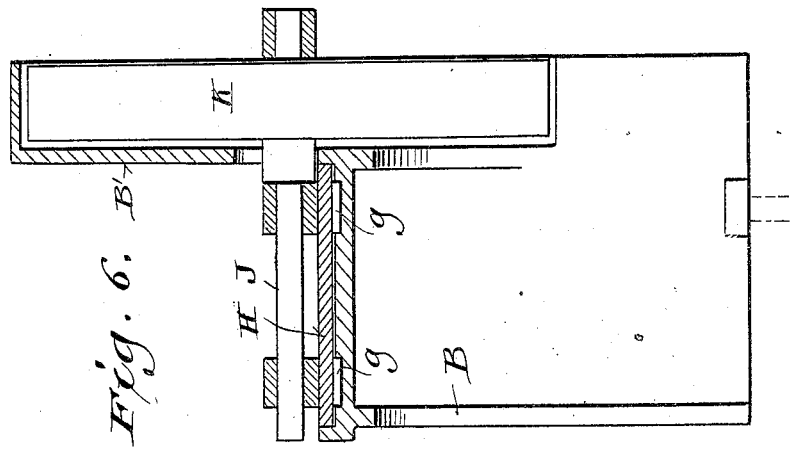

UNITED STATES PATENT OFFICE.

DONALD A. KENNEDY, OF ASHLAND, WISCONSIN.

BAND-SAW MACHINE.

No. 836,117.  Specification of Letters Patent.  Patented Nov. 20, 1906.

Application filed April 10, 1905. Serial No. 254,811.

*To all whom it may concern:*

Be it known that I, DONALD A. KENNEDY, a citizen of the United States, and a resident of Ashland, in the county of Ashland and State of Wisconsin, have invented certain new and useful Improvements in Band-Saw Machines; and I do hereby declare that the following is a full, clear, and exact description thereof.

My invention contemplates economical production of lumber, especially quarter-sawed stuff; and it consists in certain peculiarities of construction and combination of parts embraced in the simple and efficient horizontal band-saw machine hereinafter particularly set forth with reference to the accompanying drawings and subsequently claimed, the organization of the machine being such that a plurality of pieces of lumber of different thicknesses may be cut at the same time from log-quadrants or squared timbers, or both.

Figure 1 of the drawings represents a side elevation of a band-saw machine in accordance with my invention, having parts thereof cut away; Fig. 2, a transverse section view of the machine, indicated by line 2 2 in Fig. 1; Fig. 3, a longitudinal section view of the machine, indicated by lines 3 3 in Figs. 2 and 4; Fig. 4, a plan view of the machine, partly in horizontal section, as indicated by line 4 4 in Fig. 1; Fig. 5, a horizontal section view of the machine on the plane indicated by line 5 5 in Fig. 1; Fig. 6, a section of a fragment of the machine on the vertical plane indicated by line 6 6 in Fig. 4; Fig. 7, a diagram illustrating feed and presser rolls of the machine, and Fig. 8 a diagram illustrating a conical feed-roller.

Referring by letter to the drawings, A indicates a horizontal main frame of any suitable construction and which is suitably supported in practice. Guided in the main frame is a vertically-adjustable auxiliary frame B, having an upwardly-extending portion B', constituting a shield for the band-saw hereinafter specified. The auxiliary frame is shown provided with depending screws $b$, guided in brackets $c$ $d$ of the main frame, and guide-bolts $e$, engaging the brackets $c$, also engage longitudinal grooves in the screws, the engagement of one of the bolts with a screw-groove being shown in Fig. 2. Nuts $f$ are arranged on the screws $b$ between the main-frame brackets $c d$, and these nuts are in bevel-gear connection with a shaft C, for which said brackets $d$ serve as bearings. The shaft is in spur-gear connection with a crank-spindle D, and by turning this spindle the vertical adjustment of the auxiliary frame B is regulated.

The auxiliary frame is provided with bearings for an arbor E, on which a driving-pulley F and a band-saw wheel G are made fast. Mounted on rollers $g$, bedded upon the auxiliary frame, is a horizontal carrier H, and superimposed on the carrier in pivotal connection therewith is a yoke I, provided with bearings for the arbor J of another band-saw wheel K, straddled by said yoke, as is best shown in Fig. 4. Guide-bars $h$ are attached to the auxiliary frame to lap the carrier H, and the pivotal yoke I is provided with a segmental slot engaged by a clamp-screw $i$, that also engages said carrier. An adjusting-screw $j$ turns in a threaded aperture of an upper back flange of the carrier and extends through an aperture in a vertical rib $k$ of the auxiliary frame B, a taper head $j'$ of the screw being engaged with the forward latch end of a weighted lever L, fulcrumed between ears of said rib. To facilitate turning of the screw $j$, the same is provided with a hand-wheel, and by means of said screw the carrier and yoke therewith are adjusted to tighten the horizontal band-saw M, that runs on the wheels aforesaid. The weighted lever L serves as a means to prevent automatic working back of the adjusting-screw in its bearing incidental to vibration or other causes. An upper back flange of the yoke I is provided with a bearing for a screw-spindle $m$, and this spindle is in bevel-gear connection with a turning-rod $n$, that has its bearings in lugs of said flange and is provided with a hand-wheel to facilitate its operation. A nut $p$ on the screw is conical at its ends and has loose play in an aperture of the back flange of the carrier. By loosening the clamp-screw $i$ and the nut $q$ on the pivot-bolt of the yoke I this yoke may be adjusted on said bolt to guide the band-saw on its wheels, said screw and nut being again tightened to hold said yoke in adjusted position.

Journaled in the main and auxiliary frames of the machine are vertical feed-rolls N N', preferably somewhat out of line one with the other, and journaled in said main frame are horizontal feed-rolls O P in opposite directions from the vertical ones aforesaid. Vertical guard-rolls Q are also provided in connection with the main frame of the machine. The lower journal R of one of the vertical feed-rolls is downwardly extended and intended in practice for connection with suitable driving mechanism. In bevel-gear connection with the roll-journal R is a horizontal shaft S, having like gear connection with a journal of the other vertical feed-roll. Similarly geared to the roll-journal R are inclined shafts T U in like gear with horizontal shafts V W, with which journals of the horizontal feed-rolls are also bevel-geared, the main frame being provided with suitable bearings for the several shafts.

A central guide X for the lower horizontal portion of the band-saw is rigid with the auxiliary frame between the vertical feed-rolls N N', and in dovetail sliding connection with said frame, in opposite directions from said guide, are other saw-guides Y, each adjustable on a screw-rod Z, for which the aforesaid frame is provided with suitable bearings. An end of one of the rods Z appears in Fig. 2, and both of said rods are indicated by dotted lines in Fig. 1. Feeding-out rolls A' are arranged to support material run through the machine in opposite directions on the opposite series of horizontal feed-rollers, and the saw is shown made to have both edges thereof cutting. However, it is within the scope of my invention to organize the machine for use of a single-cutting band-saw.

In pivotal connection with the auxiliary frame B and the saw-shield portion B' of same are hangers C' for press-rolls D', and one-half of the face of each press-roll is parallel to its axis, the remainder being beveled.

A sawmill-return transfer is shown at one side of the machine, and a similar transfer may be provided adjacent to the other side of said machine. At both ends of the machine suitable means will be provided for shifting material from one to another set of feed-rolls or to a transfer, and it is also shown that a canting mechanism may be employed adjacent to a transfer.

The main frame is provided with bearings for the arbor E' of a rosser or edging saw F', adjustable on said arbor between set-collars r, and a driving-pulley G' is fast on the aforesaid arbor.

Each of the horizontal feed-rolls P of the machine may be of plural diameter, as herein shown, and provided with spacing-disks s, the thickness of the material fed on said rolls and the ones O being governed by the vertical adjustment of the auxiliary saw-carrying frame above specified. However, feed-rolls of the same diameter, more or less, throughout their length may be substituted for the ones P herein illustrated. In a single-cut band sawing-machine rolls P, when of the same diameter throughout, may be utilized as a return-transfer for material moved over from the cutting side of the machine by any suitable means on a suitable support.

From the foregoing it will be understood that the lower horizontal portion of the band-saw does the cutting, and the organization of the machine, as herein shown and described, is such that the horizontal feed-rolls O are on the forwarding side of the dividing vertical feed-rolls N N', and the other horizontal feed-rolls P are on the return side of said vertical rolls. To provide for cutting the material into pieces of gradually-diminishing thickness in a transverse direction, either or both sets of horizontal feed-rolls may be of the conical form shown at O' in Fig. 8. The press-rolls D' are preferably narrow and of large diameter, their pressure being downward and inward toward the vertical feed-rolls N N', that are preferably out of line with one another, as above specified. Hence on opposite sides of the machine there is a bind of the material against said feed-rolls in the direction of its travel, to thereby increase the friction, that is proportionate to the distance the aforesaid vertical feed-rolls are put out of line with one another. The horizontal feeding-out rolls A' are on a higher plane than the horizontal feed-rolls a distance equal to or greater than the thickness of the saw in order that the material being cut will be supported so as not to bind on said saw. The disposition of the supporting-rolls is best shown in Fig. 2, wherein is also shown a fragment of material moving forward over one of said rolls that is above the plane of the horizontal feed-rolls O the distance of the thickness of the saw.

In Fig. 1 the dotted lines at right angles on the log-quadrant therein shown indicate the quarter-sawing of said quadrant, and in said Fig. 1 it is shown that a plurality of pieces of material may be cut on either or both sides of the machine by the double-cutting band-saw, the rotation of one set of horizontal feed-rolls being opposite that of the other set with which they are simultaneously driven. The bearings for the horizontal feed-rolls O P are on cross-pieces of the main frame, and these cross-pieces are adjustable on screws t, that turn in the stationary portion of said frame. Certain of the adjusting-screws t are made to serve as spindles for the guard-rolls Q aforesaid, and by means of said screws the rolls O P may be brought to or from the saw in a slight degree at either end, as may appear necessary when said saw is running.

Having thus described my invention, what I claim as new, and desire to secure by Letters Patent, is—

1. In a horizontal band-saw machine, the saw, means for supporting and driving the same, vertical feed-rolls, horizontal feed-rolls under the plane of the lower straight portion of said saw, means for driving the several rolls aforesaid, and suitably-arranged press-rolls each having a portion of its face parallel to its axis and the remainder beveled to exert pressure downward toward the horizontal rolls simultaneous with pressure inward toward the vertical rolls on the fed material.

2. In a horizontal band-saw machine, the saw having both edges thereof toothed, means for supporting and driving the same, vertical feed-rolls, horizontal feed-rolls under the plane of the lower straight portion of said saw in opposite directions from said vertical feed-rolls, means for driving the several rolls aforesaid, the rotation of one set of the horizontal rolls being opposite that of the other set of same, and suitably-arranged press-rolls each having a portion of its face parallel to its axis and the remainder beveled to exert pressure downward toward the horizontal rolls simultaneous with pressure inward toward the vertical rolls on the fed material.

3. In a horizontal band-saw machine, the saw having vertically-adjustable supporting and driving mechanism, vertical feed-rolls, horizontal feed-rolls under the plane of the lower straight portion of said saw, means for driving the several rolls aforesaid, and press-rolls each having a portion of its face parallel to its axis and the remainder beveled to exert pressure downward toward the horizontal rolls simultaneous with pressure inward toward the vertical rolls on the fed material.

4. In a horizontal band-saw machine, the saw, means for supporting and driving the same, vertical feed-rolls, horizontal feed-rolls under the plane of the lower straight portion of said saw, means for driving the several rolls aforesaid, and pivotally-hung press-rolls each having a portion of its face parallel to its axis and the remainder beveled to exert pressure downward toward the horizontal rolls simultaneous with pressure inward toward the vertical rolls on the fed material.

5. In a horizontal band-saw machine, the saw, means for supporting and driving the same, vertical feed-rolls out of line one with the other longitudinally of the machine, horizontal feed-rolls under the plane of the lower straight portion of said saw, means for driving the several rolls aforesaid, and press-rolls each configured to exert pressure downward toward the horizontal rolls simultaneous with pressure inward toward the vertical rolls on the fed material, the disposition of said vertical rolls being such as to increase friction on said material.

6. In a horizontal band-saw machine, the saw, means for supporting and driving the same, vertical feed-rolls, vertical guard-rolls, horizontal feed-rolls under the plane of the lower straight portion of said saw, means for driving the several feed-rolls, and suitably-arranged press-rolls each having a portion of its face parallel to its axis and the remainder beveled to exert pressure downward toward the horizontal rolls simultaneous with pressure inward toward the vertical rolls on the fed material.

7. In a horizontal band-saw machine, the saw, means for supporting and driving the same, a stationary central guide for the lower straight portion of said saw, adjustable saw-guides in opposite directions from the one aforesaid, vertical feed-rolls approximately in line with the central saw-guide, horizontal feed-rolls under the plane of said lower straight portion of the saw in opposite directions from the rolls aforesaid, means for driving the several feed-rolls, and suitably-arranged press-rolls each having a portion of its face parallel to its axis and the remainder beveled to exert pressure downward toward the horizontal rolls simultaneous with pressure inward toward the vertical rolls on the fed material.

8. In a horizontal band-saw machine, the saw, means for supporting and driving the same, vertical feed-rolls, horizontal feed-rolls each of plural diameter under the plane of the lower straight portion of said saw, the varying distances between these horizontal rolls and the saw corresponding to various standard thicknesses of lumber; means for driving the several feed-rolls, and suitably-arranged press-rolls each configured to exert pressure downward toward the horizontal rolls simultaneous with pressure inward toward the vertical rolls on fed material.

9. In a horizontal band-saw machine, the saw, means for supporting and driving the same, vertical feed-rolls, horizontal feed-rolls of different diameters in sections of their length under the plane of the lower straight portion of said saw, the varying distances between the roll-sections and saw corresponding to various standard thicknesses of lumber; means for driving the several feed-rolls, and suitably-arranged press-rolls each configured to exert pressure downward toward the horizontal rolls simultaneous with pressure inward toward the vertical rolls on fed material.

10. In a horizontal band-saw machine, the saw having both edges thereof toothed, means for supporting and driving the same, vertical feed-rolls, horizontal feed-rolls under the plane of the lower straight portion of said saw in opposite directions from said vertical feed-rolls, the horizontal rolls in one set of same being of plural diameter; means for driving the several feed-rolls, and suitably-arranged press-rolls each configured to exert pressure downward toward the horizontal rolls simultaneous with pressure inward toward the vertical rolls on fed material.

11. In a horizontal band-saw machine, the saw, means for supporting and driving the same, vertical feed-rolls, horizontal feed-rolls under the plane of the lower straight portion of said saw, means for driving the several feed-rolls, suitably-arranged press-rolls each configured to exert pressure downward toward the horizontal rolls simultaneous with pressure inward toward the vertical rolls on fed material, and feeding-out rolls on a higher plane than the aforesaid horizontal rolls.

12. In a horizontal band-saw machine, the saw, means for supporting and driving the same, vertical rolls, horizontal rolls under the plane of the lower straight portion of said saw, means for driving the several rolls, and pivotally-hung press-rolls of horizontal and inclined face opposed to material traveled in contact with the driven rolls.

In testimony that I claim the foregoing I have hereunto set my hand, at Ashland, in the county of Ashland and State of Wisconsin, in the presence of two witnesses.

DONALD A. KENNEDY.

Witnesses:
 DAVID MURRAY,
 CHAS. HERDEG.